A. H. BURNS.
AUTOMOBILE STARTER.
APPLICATION FILED OCT. 7, 1910.
998,836. Patented July 25, 1911.
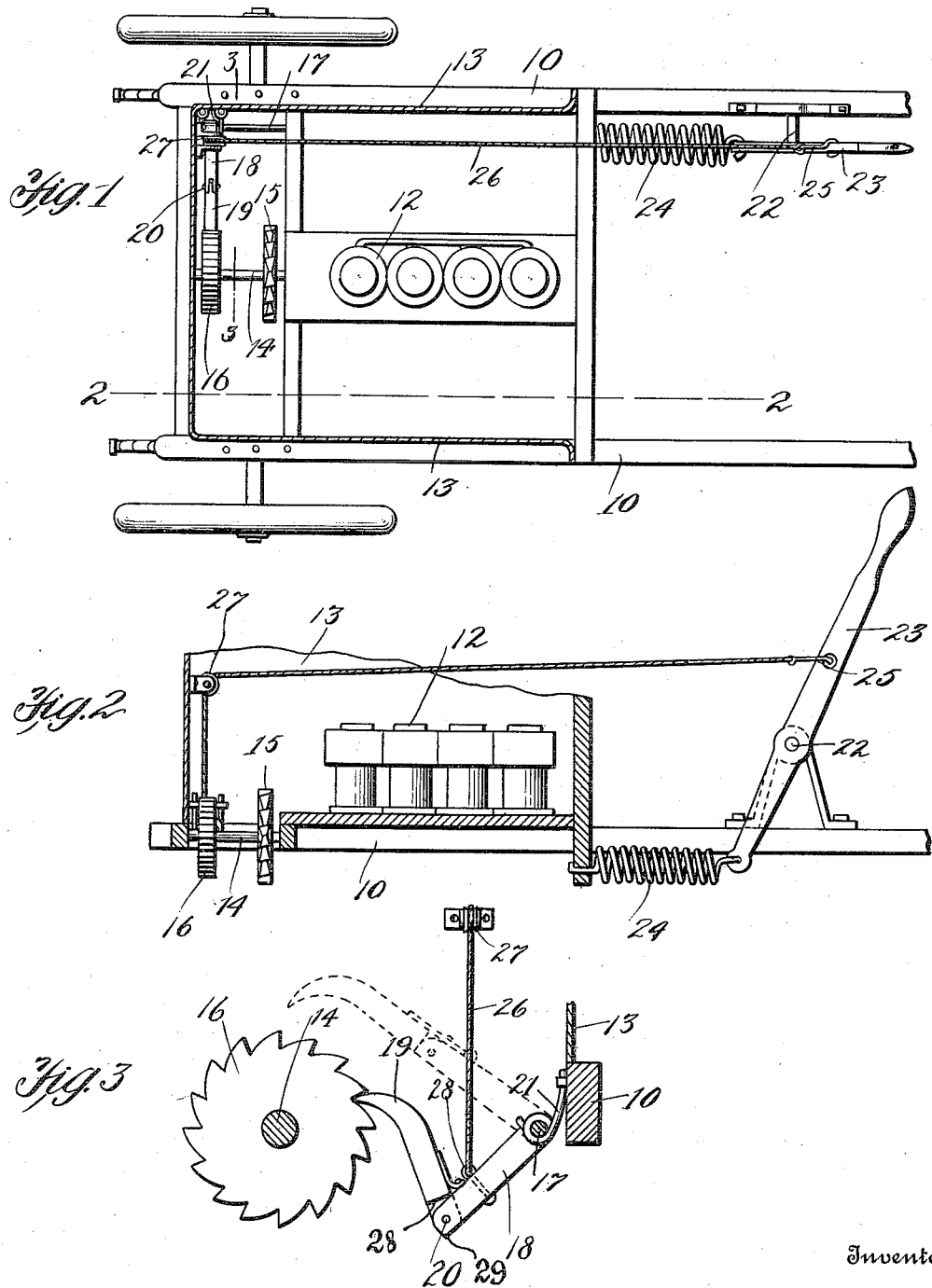

UNITED STATES PATENT OFFICE.

ARTHUR H. BURNS, OF PENN YAN, NEW YORK.

AUTOMOBILE-STARTER.

998,836.  Specification of Letters Patent.  Patented July 25, 1911.

Application filed October 7, 1910. Serial No. 585,845.

*To all whom it may concern:*

Be it known that I, ARTHUR H. BURNS, a citizen of the United States, residing at Penn Yan, in the county of Yates and State of New York, have invented certain new and useful Improvements in Automobile-Starters, of which the following is a specification.

This invention relates to improvements in devices for starting automobiles from the seat of the driver and without the necessity for dismounting from the vehicle, and has for one of its objects to simplify and improve the construction and increase the efficiency and utility of devices of this character.

With this and other objects in view, the invention consists in certain novel features of construction as hereinafter shown and described.

The improved device may be applied to automobiles of various constructions without material structural changes, and for the purpose of illustration is shown applied to a conventional automobile; and, in the drawings employed to illustrate the preferred embodiment of the invention, Figure 1 is a plan view of the forward portion of an automobile with the improvement applied. Fig. 2 is a section on the line 2—2 of Fig. 1. Fig. 3 is a section on the line 3—3 of Fig. 1.

The frame work of the automobile is represented conventionally at 10, the engine indicated at 12, the engine housing or cap at 13, the main starting shaft of the engine at 14, and the wind wheel for controlling the air to the magazine at 15, these parts being of the ordinary construction.

Mounted upon the shaft 14 is a ratchet wheel 16. Connected to the frame 10 is a shaft or bar 17, and mounted to swing upon this shaft is an arm 18 having a pawl 19 swinging at 20 from its free end, the pawl being designed to engage the teeth of the ratchet. The arm 18 is held yieldably in position by a suitable spring 21, while the pawl 19 is preferably operated wholly by gravity. At its inner or pivoted end the pawl 19 is provided with a square shoulder 28 which engages a stop 29 on the arm 18 when the pawl is in its elevated position, and thus limits the movement in one direction. Pivoted at 22 to the frame 10 is an operating lever 23, and connected to the lower end of the lever is a relatively heavy spring 24 which operates to maintain the lower end of the lever in withdrawn position. Connected at 25 to the lever 23 is a cable or cord 26 which leads over a guide pulley 27 and thence to the arm 18 to which it is attached at 28. By this arrangement it will be obvious that the force of the spring is utilized to maintain the lower end of the lever in withdrawn position and likewise cause the lever to maintain the arm 18 and its pawl 19 yieldably in their upward position. By this simple means when the engine is to be cranked for starting the same the operator pushes the upper end of the lever 23 forwardly which slacks up the flexible member 26 and permits the arm 18 to fall by gravity to its lowest position. Then when the operator releases the lever the spring 24 instantly operates the lever and elevates the arm 18 and causes the pawl 19 to quickly rotate the shaft 14 through its connection with the ratchet 16. By this means the force of the spring 24 is utilized to actuate the ratchet and correspondingly actuate the shaft 14 and apply the necessary starting or sparking motion to the engine. The lever 23 it will be noted is located convenient to the hand of the operator so that the latter can manipulate the engine valves with one hand and actuate the lever 23 with the other, thus operating the portions simultaneously. By this means the engine is under complete control at all times, and can be started or stopped by the driver without the necessity for leaving his seat. It will be noted that the force applied to the shaft is entirely through the spring 24, which operates very quickly, and therefore produces the best possible results, as the rapid motion of the starter is an essential feature in devices of this character. Thus it does not require the exercise of the fatiguing and rapid movement of the crank lever, but the movements which produce the sparking action are produced entirely by the spring, and does not depend therefore on the movement of the operator. This is an important feature in applicant's device, and insures the certainty of the action regardless of the movement which may be imparted to the lever. The improved device is thus always in position for operation.

Having thus described my invention, what is claimed as new is:

The combination with an automobile including the frame, of an engine shaft, a ratchet wheel carried by said shaft, an arm swinging upon said frame, a pawl swinging from said arm and movable by gravity in one direction and provided with a stop to limit the movement in the opposite direction, an operating lever connected to said frame, connecting means between said lever and said swinging arm, and a spring operating when retracted to yieldably maintain said lever in withdrawn position and holding the arm and pawl normally out of engagement with the ratchet, whereby said arm and pawl are released when the lever is moved against the resistance of the spring and the pawl disposed in operative position relative to the ratchet wheel and the reaction of the spring utilized to impart motion to said engine shaft.

In testimony whereof, I affix my signature in presence of two witnesses.

ARTHUR H. BURNS. [L. S.]

Witnesses:
GEORGE S. SHEPPARD,
NORRIS S. DAILEY.